United States Patent
Broeders et al.

(10) Patent No.: US 8,162,288 B2
(45) Date of Patent: Apr. 24, 2012

(54) COMPOSITE VALVE

(75) Inventors: Jan Broeders, Breda (NL); Rene Van Nieulande, Etten-Leur (NL); Barry Huijben, Oosterhour (NL)

(73) Assignee: Tyco Valves & Controls BV, AB Breda (NL)

( * ) Notice: Subject to any disclaimer, the term of this patent is extended or adjusted under 35 U.S.C. 154(b) by 215 days.

(21) Appl. No.: 12/674,402

(22) PCT Filed: Jun. 6, 2008

(86) PCT No.: PCT/EP2008/057079
§ 371 (c)(1),
(2), (4) Date: Feb. 19, 2010

(87) PCT Pub. No.: WO2009/024367
PCT Pub. Date: Feb. 26, 2009

(65) Prior Publication Data
US 2011/0121219 A1 May 26, 2011

(30) Foreign Application Priority Data
Aug. 21, 2007 (EP) .................................... 07253284

(51) Int. Cl.
*F16K 11/22* (2006.01)

(52) U.S. Cl. ...................................... 251/306; 251/305

(58) Field of Classification Search .................. 251/304, 251/305, 306, 307, 308
See application file for complete search history.

(56) References Cited

U.S. PATENT DOCUMENTS

| | | | |
|---|---|---|---|
| 2,912,218 A | 11/1959 | Stillwagon | |
| 3,399,863 A * | 9/1968 | Fawkes | 251/306 |
| 3,765,647 A | 10/1973 | Grove et al. | |
| 3,902,694 A * | 9/1975 | Friedell | 251/58 |
| 4,043,359 A | 8/1977 | Christo | |
| 4,163,544 A | 8/1979 | Fowler et al. | |
| 4,252,349 A | 2/1981 | Mahoff | |
| 4,290,456 A | 9/1981 | Ahrbeck | |
| 4,465,040 A | 8/1984 | Pelizzoni | |
| 4,653,725 A | 3/1987 | Nanz et al. | |
| 4,774,750 A | 10/1988 | Platusich | |
| 4,777,977 A | 10/1988 | Platusich | |
| 4,783,052 A * | 11/1988 | Walden | 251/368 |

(Continued)

FOREIGN PATENT DOCUMENTS

CH 653424 A5 12/1985

(Continued)

*Primary Examiner* — John Fristoe, Jr.

(57) ABSTRACT

A valve utilizes a composite two-piece housing to provide a low cost, high strength, light weight alternative to conventional metal and plastic valves adaptable for corrosive and non-corrosive environments. The valve includes a valve body defined by a first body half coupled to a second body half. A valve disk assembly is disposed between the first and second body halves. The disk assembly includes a valve disk, a valve stem and a valve seal. The disk stem is positioned within the valve disk along a central axis of the disk such that when the disk is rotated about the valve stem, the valve is opened or closed. The valve seal includes a primary portion lining an interior surface formed by the first and second body halves to engage an outer surface of the disk. The seal also includes a secondary portion disposed within and between the first and second body halves. The primary and secondary sealing portions configured to retain position within the housing and in sealing engagement with the disk.

20 Claims, 4 Drawing Sheets

U.S. PATENT DOCUMENTS

| | | |
|---|---|---|
| 5,375,569 A | 12/1994 | Santella |
| 5,681,025 A * | 10/1997 | Kuhn et al. .............. 251/129.12 |
| 5,695,170 A * | 12/1997 | Dernovsek et al. ........... 251/305 |
| 6,533,332 B2 | 3/2003 | Vitel et al. |
| 6,978,752 B2 | 12/2005 | Albertson et al. |
| 2005/0235932 A1 | 10/2005 | Albertson et al. |

FOREIGN PATENT DOCUMENTS

| | | |
|---|---|---|
| DE | 2324353 A1 | 11/1974 |
| GB | 1301099 A1 | 12/1972 |

* cited by examiner

COMPOSITE VALVE

FIELD OF THE INVENTION

The present invention relates generally to valves. More particularly, the invention relates to a butterfly valve utilizing a composite two-piece housing. The valve provides a low cost, high strength, light weight alternative to metal body and plastic valves adaptable for corrosive and non-corrosive environments.

BACKGROUND OF THE INVENTION

Process valves are used in various types of applications to prevent and/or allow the flow of media through a pipeline. These valves are mounted within a pipeline and clamped or otherwise held in position between a pair of pipe flanges. Conventional valves are usually made of a metal body. The trim of the valve (disc and seat) depending on temperature and pressure requirements for a particular type of application. While metal valves provide for long and reliable stroke life, they are relatively heavy which may require additional physical support within a pipeline structure. The relative high weight can be considered as a disadvantage for installation locations which are difficult to reach, as well as in applications in road and cargo containers. Metal body valves also have a limited external corrosion resistance when installed in maritime environments. Alternatively, plastic valves have been employed in low temperature and low pressure environments to provide a light weight, low cost alternative to metal valves. Typical plastic valve materials include, for example, PVC, PVC-U, PP, ABS, etc. However, plastic valves have a restricted pressure rating at elevated temperatures.

Composite valves have been introduced to provide an alternative to both metal and plastic valves. However, thermal expansion properties of various types of composites sometimes compromises the sealing properties associated with these valves. In addition, the positioning of the valve seals within the valve body has not been configured to withstand the forces associated with opening and closing these valves within a process pipeline.

SUMMARY

The above-referenced drawbacks and others are overcome by the present invention described herein with reference to the detailed description, drawings and appended claims.

Embodiments of the invention are directed to a valve utilizing a composite two-piece housing and a sealing configuration disposed therein. The valve includes a valve body defined by a first body half coupled to a second body half. A valve disk assembly is disposed between the first and second body halves. The disk assembly includes a valve disk, a valve stem and a valve seal. The disk stem is positioned within the valve disk along a central axis of the disk such that when the disk is rotated about the valve stem, the valve is opened or closed. The valve seal includes a primary portion lining an interior surface formed by the first and second body halves to engage an outer surface of the disk. The seal also includes a secondary portion disposed within and between the first and second body halves. The primary and secondary sealing portions configured to retain position within the housing and in sealing engagement with the disk.

DETAILED DESCRIPTION

Figure 1:
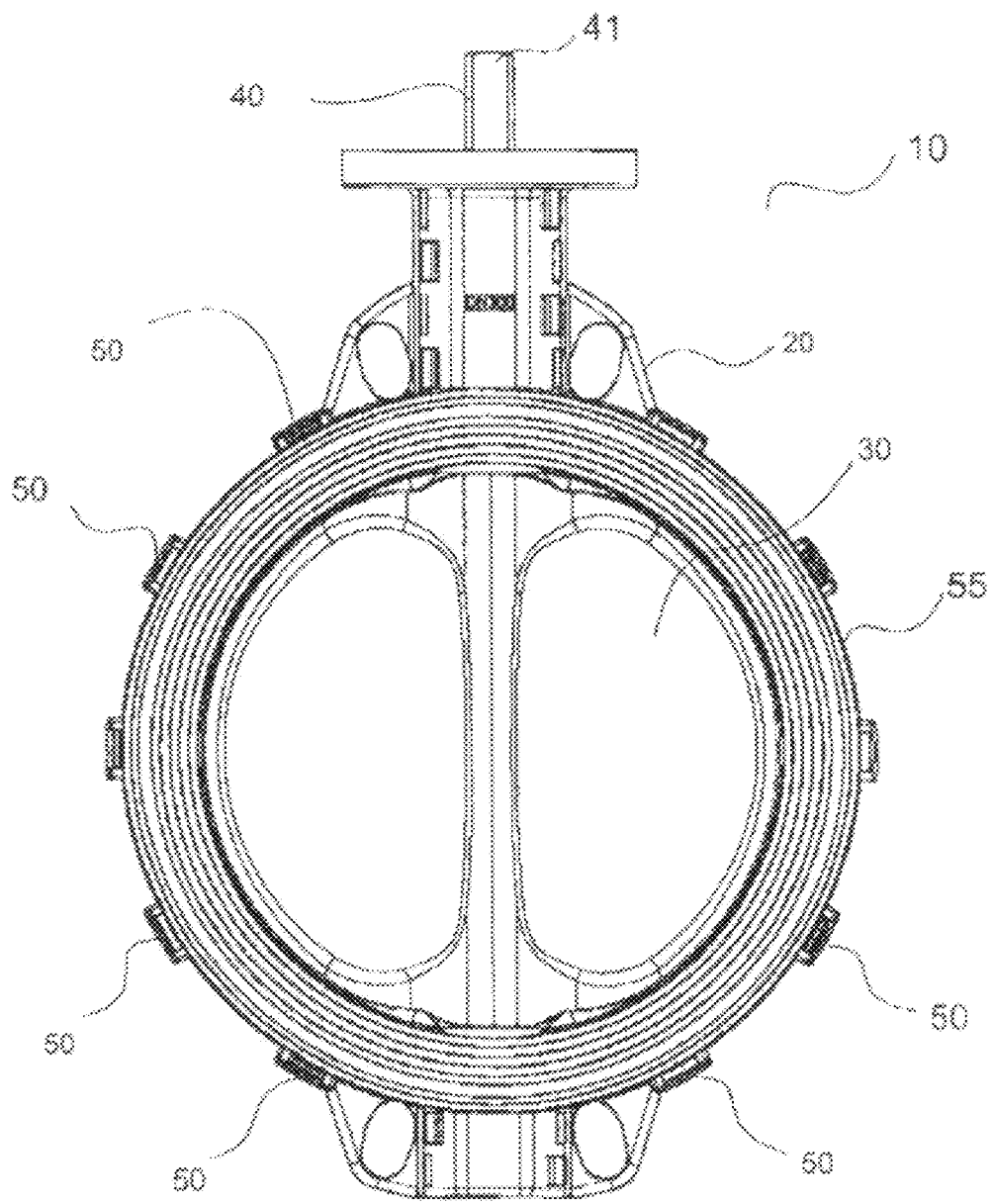
FIG. 1 illustrates an exemplary embodiment of a composite valve in a closed position in accordance with an embodiment of the present invention.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 illustrates an exemplary embodiment of a composite valve 10 in a closed position mounted along a process pipeline that when opened, provides an inlet and outlet flow passage within the pipeline. In its closed position, valve 10 prevents process media from flowing downstream or upstream within the pipeline. Valve 10 includes a valve disk 30 disposed within valve housing or body 20. A disk stem 40 is disposed within a central axis of disk 30 and extends a distance above and below housing 20. Disk stem 40 is configured, at its top end 41, to receive a mechanism (actuator, handle, etc.) to rotate disk 30 to open and closed positions. The diameter of disk 30 may be, for example, 50-300 mm with other sizes configured for particular applications. Disk 30 may have an inner core of short fiber composite material and an outer layer of high resistant long fiber composite material to provide strength. Housing 30 includes a plurality of clamps 50 spaced around the perimeter of valve 10 to provide a fastening mechanism for the housing as described in detail below. O-ring 55 is disposed within a cavity extending around the outside of housing 20 to create a seal between valve 10 and the process pipeline in which valve 10 is mounted. The composite material utilized for housing 20 includes up to 60% of inorganic fillers which obstruct water absorption and provide dimensional stability. The present embodiment of valve 10 may be used in pressures of up to 10 bar and in a temperature range of −40° C. to 120° C. In addition, valve 10 may be employed in corrosive environments in high line velocities and vacuum applications.

Figure 2:
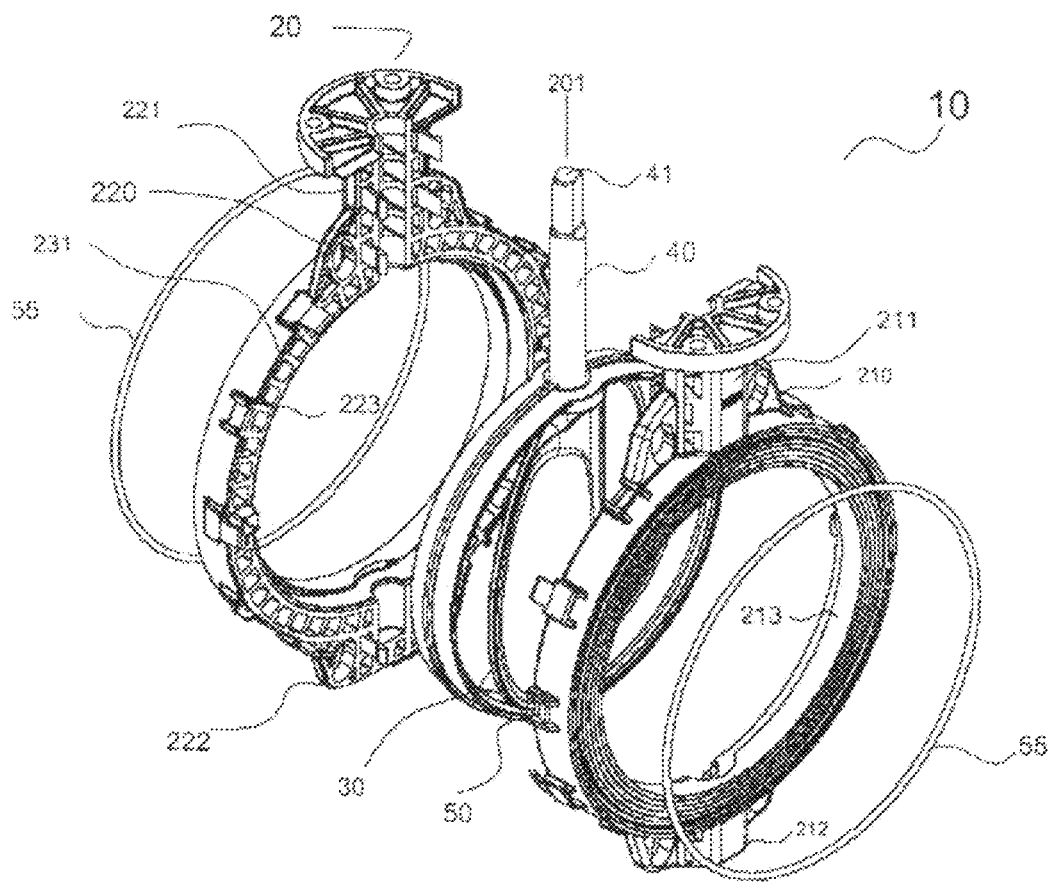
FIG. 2 is a prospective partitioned view of a composite valve in accordance with an embodiment of the present invention.

FIG. 2 is a prospective partitioned view of valve 10 illustrating housing 20 which is defined by first valve body half 210 and second valve body half 220 and disk assembly 201. First body half 210 is connected to second body half 220 via clamps 50. Disk assembly 201 includes valve disk 30, valve stem 40 and circular seat 250. First body half 210 includes a top portion 211, bottom portion 212 and circular portion 213, Second body half 220 includes top portion 221, bottom portion 222 and circular portion 223. Top portion 211 and bottom portion 212 are adapted to receive an end portion of disk stem 40 and circular portion 213 is adapted to receive a portion of disk 30. Similarly, top portion 221 and bottom portion 222 are adapted to receive an end portion of disk stem 40 and circular portion 213 is adapted to receive a portion of disk 30. In particular, top portions 211 and 221 of body halves 210 and 220, respectively, receives end portion 31 of valve stem 40.

Bottom portions 212 and 222 of body halves 210 and 220, respectively receive lower portion 43 (shown in FIG. 3) of valve stem 40. Each body half 210 and 220 is molded with a plurality of cavities 231 interspersed within each body half to provide rigidity and strength to housing 20.

Disk assembly 210 is disposed between first body half 210 and second body half 220. Seat 250 surrounds the circumference of disk 30 to create a tight seal there between. In particular, the outer circumference of disk 30 creates a seal with seat 250 when valve 10 is in a closed position sufficient to prevent process flow through valve 10. In an open position, the seal between seat 250 and disk 30 is broken as disk 30 is rotated about valve stem 40 sufficient to allow process flow through valve 10. Disk 30 is made from an extended grade composite material with corrosion resistance and mechanical properties. Seat 250 may be an elastomer such as ethylene propylene diene monomer (EPDM) and forms a primary sealing and secondary body split sealing as described below. Disk 30 is fixedly attached to and rotates around a substantially central axis about valve stem 40. Disk 30 may be manufactured using an injection molding process and valve stem 40 is preferably stainless steel to withstand various forces during valve operation.

As noted above, the outer surface of circular portion 213 receives O-ring 55 to accommodate flange sealing with an attached pipeline. Similarly, circular portion 223 also receives O-ring 55 to accommodate flange sealing with an attached pipeline. The two O-rings 55 are similarly configured and allow for a wide range of flange connections including slip-on and burdel flanges with no additional flange sealing required.

Figure 3:
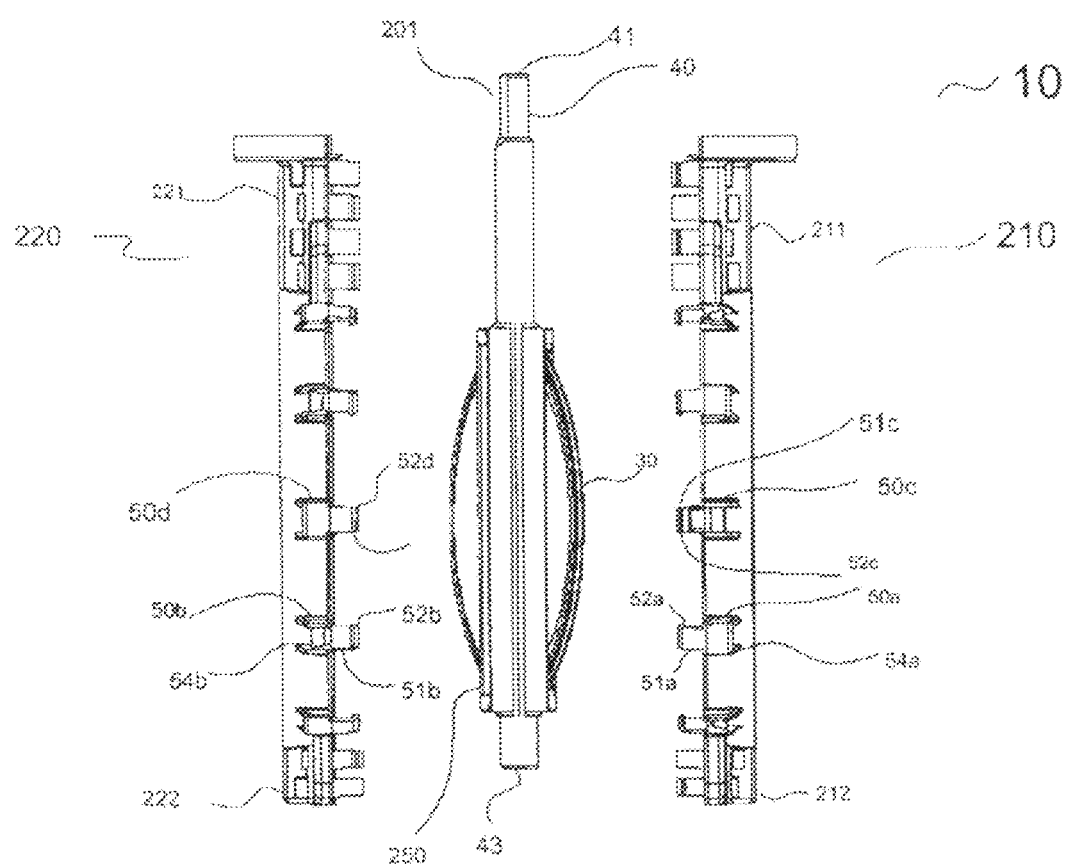
FIG. 3 is a side partitioned view of a composite valve in accordance with an embodiment of the present invention.

FIG. 3 is a side partitioned view illustrating the components that comprise clamp 50 used to attach first body half 210 to second body half 220 as shown in FIG. 1. As mentioned earlier, clamps 50 are spaced around the perimeter of valve housing 20. Depending on the size of the valve, the number and distance between clamps 50 may vary. Each clamp 50 is defined by at least two parts: namely first clamp half 50a and second clamp half 50b. Each clamp part includes an extension arm 51a or 51b having a curled end 52a or 52b that either bends toward disk 30 (curled end 52a) or bends outward away from disk 30 (curled end 52b). Each clamp half 50a and 50b are joined such that the respective curled ends 52a and 52b engage clamp ridges 54a and 54b, respectively. For example, when first body half 210 is press fit with second body half 220, curled end 52a of extension arm 51a of clamp half 50a engages clamp ridge 54b of second clamp half 50b. Similarly, curled end 52b of extension arm 51b of clamp half 50b engages clamp ridge 54a of clamp half 50a. In addition, the direction of the curled clamp ends 52a and 52b alternate for each clamp 50 around the perimeter of valve body 20. In particular, extension arm 51a has a curled end 52a which bends toward disk 30. Adjacent clamp halves 50c includes extension arm 51c having curled end 52c that bends away from disk 30 as compared to clamp half 50a. Clamp half 50b includes extension arm 51b having a curled end 52b which bends outward away from disk 30. Conversely, adjacent clamp half 50d includes extension arm 51d having curled end 52d which bends inward toward disk 30. In this manner, the adjacent clamps around the perimeter of valve body halves 210 and 220 have alternating curled extension arms to provide a clamping mechanism that retains valve disk assembly 201 within valve housing 20.

Figure 4A:
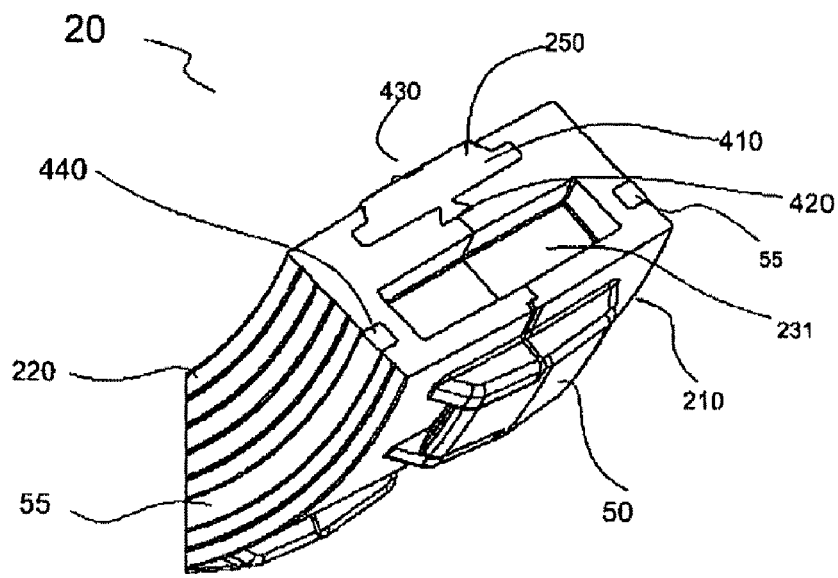
FIG. 4A is a sectional cut-away view of the valve seal in accordance with an embodiment of the present invention.

FIG. 4A is a sectional cut-away view of the valve housing 20 comprised of first body half 210, second body half 220 and seal 250 integrally positioned therein to create a seal with disk 30. Seal 250 has an internal valve surface 430 that engages disk 30 when valve 10 is in a closed position. Seat 250 is defined by a primary split seal portion 410 and a secondary split seal portion 420. O-ring 55 is shown as positioned within groove 440 of circular housing portion 223 to provide a flange sealing connection when valve 10 is attached to a pipeline. Cavity 231 is formed by respective molded cavities in each of body halves 210 and 220.

Figure 4B:
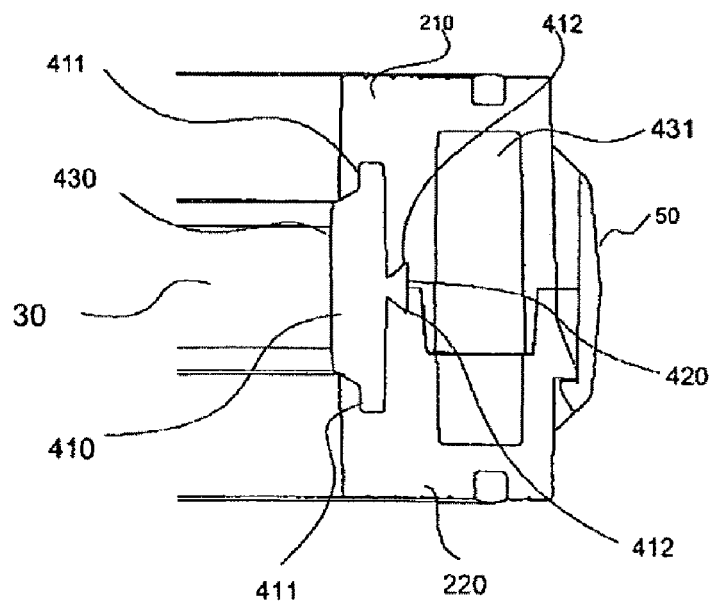
FIG. 4B is a cross sectional top view of valve housing and valve seal in accordance with an embodiment of the present invention.

FIG. 4B is a cross sectional top view of valve housing 20 to better illustrate the configuration or primary split seal portion 410 and secondary split seal portion 420. In particular, primary split seal portion 410 has a generally rectangular shape with cut out portions 411. These cut away portions 411 provide a retaining edge that engages the respective valve body halves 210 and 220 and secure seal 250 in position. Secondary split seal portion 420 has a substantially triangular shape and defines ridged portions 412. Similar to cut-away portions 411 of primary split seal 410, ridged portions 412 provide a retaining edge for seal 250 within housing valve housing 20. By positioning seal 250 within body halves 210 and 220 with both a primary and secondary sealing configuration, the forces exerted on seal 250 when disk 30 is opened and closed are absorbed. The seat is clamped between the two body half's in such a way that the pipeline flanges have no direct influence on the sealing capability of the seat on the disc-stem as with traditional complete isolating seat liners. By retaining seal 250 between first 210 and second body 220 halves in this manner, fluttering is avoided. In addition, when valve 10 is used in vacuum applications, seal 250 acts like a bonded seat. Accordingly, a composite valve having a two-piece housing construction provides a resilient sealing configuration and provides a low cost, high strength, light weight valve for use in corrosive and non-corrosive environments.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

The invention claimed is:

1. A composite butterfly valve comprising:
   first and second body halves each being of composite material, said body halves being secured together along a coupling plane to form a two-part valve body, said body having inlet and outlet flow passageways;
   a valve disk assembly disposed between said first and second body halves, said disk assembly having a valve disk and a valve stem having a longitudinal axis which lies in the coupling plane of the first and second body halves, said valve stem being within said valve disk along a central axis of said disk such that when said disk is rotated about said valve stem, the disk moves between an open position in which it faces across the flow path between the inlet and outlet flow passages so as to allow the passage of fluid therebetween and a closed position in which it faces along the flow path so as to block the passage of fluid therebetween; and
   a seal having a primary seal portion and a secondary seal portion disposed between the first and second body halves, the primary seal portion further having an internal surface for sealing against an outer surface of said disk, the secondary seal portion having a substantially triangular cross-section in a plane oriented perpendicular to the coupling plane.

2. A composite butterfly valve in accordance with claim 1, wherein the primary and secondary seal portions are configured to retain respective positions with said housing and to maintain sealing engagement of said primary sealing portion with said disk.

3. A composite butterfly valve in accordance with claim 2 wherein said primary portion of the seal has first and a second cut-away portions, said first cut-away portion positioned within said first body half and said second cut-away portion positioned within said second body half, said first and second cutaway portions for radially retaining the seal within the housing.

4. A composite butterfly valve in accordance with claim 2 wherein said secondary seal portion of the seal has first and second ridged portions extending axially away from the coupling plane, the first and second ridged portions for radially retaining the seal within the housing.

5. A composite butterfly valve in accordance with claim 1, wherein said first body half is coupled to said second body half via a plurality of clamps positioned around said first and second body halves.

6. A composite butterfly valve in accordance with claim 5, wherein each of said clamps is defined by a first and a second section, each of said sections having an extension arm and a ridge, said first section having an extension arm with a curved end bent toward said valve disk, said second section having an extension arm with a curved end bent away from said valve disk, each of said curved ends of said first and second sections engaging respective ridge portions of said first and second sections.

7. A composite butterfly valve in accordance with claim 1 wherein said valve stem includes a first end adapted to receive a mechanism to rotate said disk.

8. A composite butterfly valve in accordance with claim 7, wherein said valve stem has a second end extending through said valve disk into a lower portion of said valve body.

9. A composite butterfly valve in accordance with claim 1 wherein said first body half includes a plurality of cavities interspersed within said body to provide rigidity.

10. A composite butterfly valve in accordance with claim 1, wherein at least one of said first body half and said second body half includes a substantially circular portion to receive said valve disk, said one body half having a groove positioned along said circular portion configured to receive an O-ring, said O-ring providing a seal with a flange portion associated with an attached pipeline.

11. A composite butterfly valve in accordance with claim 1, wherein the valve disk is formed of composite material.

12. A composite butterfly valve in accordance with claim 11, wherein the valve disk is formed with an inner core of short fibre composite material and an outer layer of high resistance long fibre composite material.

13. A composite butterfly valve in accordance with claim 1, wherein the composite material includes up to 60% of inorganic filler.

14. A composite butterfly valve comprising:
first and second body halves each molded from composite material, said body halves each being of substantially uniform composition and being secured together along a coupling plane to form a two-part valve body, said body having inlet and outlet flow passageways; and
a valve disk assembly disposed between said first and second body halves, said disk assembly having a valve disk and a valve stem having a longitudinal axis which lies in the coupling plane of the first and second body halves, said valve stem being within said valve disk along a central axis of said disk such that when said disk is rotated about said valve stem, it moves between an open position in which it faces across the flow path between the inlet and outlet flow passages so as to allow the passage of fluid therebetween and a closed position in which it faces along the flow path so as to block the passage of fluid therebetween;
wherein said first body half is coupled to said second body half via a plurality of clamps positioned around said first and second body halves; and
wherein each of said clamps is defined by a first and a second section, each of said sections having an extension arm and a ridge, said first section having an extension arm with a curved end bent toward said valve disk, said second section having an extension arm with a curved end bent away from said valve disk, each of said curved ends of said first and second sections engaging respective ridge portions of said first and second sections.

15. A composite butterfly valve in accordance with claim 14, comprising a seal having a primary seal portion and a secondary seal portion disposed between the first and second body halves, the primary seal portion further having an internal surface for sealing against an outer surface of said disk, the secondary seal portion having a substantially triangular cross-section.

16. A composite butterfly valve in accordance with claim 14, wherein said primary portion of the seal has first and a second cut-away portions, said first cut-away portion positioned within said first body half and said second cut-away portion positioned within said second body half, said first and second cutaway portions for radially retaining the seal within the housing.

17. A composite butterfly valve in accordance with claim 14, wherein said secondary seal portion of the seal has first and second ridged portions extending axially away from the coupling plane, the first and second ridged portions for radially retaining the seal within the housing.

18. A composite butterfly valve comprising:
first and second body halves secured together along a coupling plane to form a two-part valve body, said body having inlet and outlet flow passageways;
a valve disk assembly disposed between said first and second body halves, said valve disk assembly having a valve disk and a valve stem having a longitudinal axis which lies in the coupling plane of the first and second body halves, said valve stem being rotatable along a central axis such that when said disk is rotated about said valve stem, the disk moves between an open position and a closed position with respect to the flow path between the inlet and outlet flow passages; and
a plurality of clamps positioned around the first and second body halves, the plurality of clamps for clamping the first and second body halves together, each of the plurality clamps including first and second sections, each of the first sections having a first extension arm and ridge, the first extension arm having an end bent toward the valve disk, each of the second sections having a second extension arm and a second ridge, the second extension arm having an end bent away from the valve disk, wherein the ends of the first and second extension arms engage the ridges of the second and first and second sections, respectively.

19. A composite butterfly valve in accordance with claim 18, wherein a first one of said plurality of clamps has a first clamp section associated with the first body half and a second clamp section associated with the second body half, and an adjacent second one of said plurality of clamps has a first clamp section associated with the second body half and a second clamp section associated with the first body half.

20. A composite butterfly valve in accordance with claim 19, wherein alternating ones of said plurality of clamps have alternating extension arm end orientations.

* * * * *